(12) United States Patent
Young et al.

(10) Patent No.: US 9,908,283 B2
(45) Date of Patent: Mar. 6, 2018

(54) BENDS IN COMPOSITE PANELS

(71) Applicant: The Boeing Company, Chicago, IL (US)

(72) Inventors: Stephen M. Young, Mill Creek, WA (US); Carl Aaron Davison, Snohomish, WA (US); Will George Pfeffer, Mount Vernon, WA (US)

(73) Assignee: THE BOEING COMPANY, Chicago, IL (US)

( * ) Notice: Subject to any disclaimer, the term of this patent is extended or adjusted under 35 U.S.C. 154(b) by 131 days.

(21) Appl. No.: 14/961,718

(22) Filed: Dec. 7, 2015

(65) Prior Publication Data

US 2016/0158995 A1    Jun. 9, 2016

Related U.S. Application Data

(62) Division of application No. 14/052,256, filed on Oct. 11, 2013, now Pat. No. 9,205,616.

(51) Int. Cl.
*B29C 53/04* (2006.01)
*B32B 3/30* (2006.01)
(Continued)

(52) U.S. Cl.
CPC ............ *B29C 53/04* (2013.01); *B26D 3/06* (2013.01); *B29C 53/063* (2013.01); *B29C 70/02* (2013.01); *B29D 99/001* (2013.01); *B32B 3/02* (2013.01); *B32B 3/28* (2013.01); *B32B 3/30* (2013.01); *B32B 5/26* (2013.01); *E04C 2/00* (2013.01); *E04C 2/24* (2013.01); *E04C 2/365* (2013.01); *B23C 3/34* (2013.01); *B26D 3/065* (2013.01); *B26D 5/20* (2013.01); *B29C 2793/0009* (2013.01); *B29K 2105/06* (2013.01); *B29K 2105/256* (2013.01); *B29L 2009/00* (2013.01);
(Continued)

(58) Field of Classification Search
None
See application file for complete search history.

(56) References Cited

U.S. PATENT DOCUMENTS 1,602,164 A    10/1926  Overbury
1,671,084 A     5/1928  Meyercord
(Continued)

FOREIGN PATENT DOCUMENTS

CN    101678599 A    3/2010
FR     2409855 A1   11/1977
(Continued)

OTHER PUBLICATIONS

Extended European Search Report, dated Feb. 2, 2015, regarding Application No. EP14187328.1, 5 pages.
(Continued)

*Primary Examiner* — David Sample
*Assistant Examiner* — Donald M Flores, Jr.
(74) *Attorney, Agent, or Firm* — Yee & Associates, P.C.

(57) ABSTRACT

A method and apparatus for forming a bend in composite panel. A method for forming a bend in a composite panel comprises forming a slot having a curved flange in the composite panel, inserting a sheet into the curved flange, and bending the composite panel with the slot and the sheet within the curved flange about a longitudinal axis of the slot to form the bend.

9 Claims, 8 Drawing Sheets

(51) Int. Cl.
  *B32B 3/28*    (2006.01)
  *B29C 70/02*   (2006.01)
  *E04C 2/24*    (2006.01)
  *E04C 2/36*    (2006.01)
  *E04C 2/00*    (2006.01)
  *B32B 3/02*    (2006.01)
  *B29C 53/06*   (2006.01)
  *B29D 99/00*   (2010.01)
  *B32B 5/26*    (2006.01)
  *B26D 5/20*    (2006.01)
  *B23C 3/34*    (2006.01)
  *B26D 3/06*    (2006.01)
  *B32B 3/12*    (2006.01)
  *B29L 9/00*    (2006.01)
  *B29L 31/60*   (2006.01)
  *B29K 105/06*  (2006.01)
  *B29K 105/00*  (2006.01)
  *B29L 31/30*   (2006.01)

(52) U.S. Cl.
  CPC . *B29L 2031/3076* (2013.01); *B29L 2031/608* (2013.01); *B32B 3/12* (2013.01); *B32B 2260/023* (2013.01); *B32B 2260/046* (2013.01); *B32B 2262/101* (2013.01); *B32B 2305/024* (2013.01); *B32B 2605/18* (2013.01); *Y02T 50/433* (2013.01); *Y10T 29/49801* (2015.01); *Y10T 156/1026* (2015.01); *Y10T 156/1044* (2015.01); *Y10T 409/30* (2015.01); *Y10T 428/24479* (2015.01); *Y10T 428/24612* (2015.01)

(56) References Cited

U.S. PATENT DOCUMENTS

| | | | |
|---|---|---|---|
| 2,026,650 A | 1/1936 | Onsrud | |
| 2,135,000 A | 11/1938 | Crouch | |
| 2,142,305 A | 1/1939 | Davis | |
| 2,155,969 A | 4/1939 | Green | |
| 2,505,789 A | 5/1950 | Norquist | |
| 2,922,561 A | 1/1960 | Currivan | |
| 3,122,302 A | 2/1964 | Wood | |
| 3,341,908 A | 9/1967 | Lock | |
| 3,456,380 A | 7/1969 | Cameron | |
| 3,890,108 A | 6/1975 | Welsh | |
| 3,969,868 A | 7/1976 | Bainter et al. | |
| 4,024,684 A | 5/1977 | Holmgren | |
| 4,160,052 A * | 7/1979 | Krysiak | B60R 13/04 156/211 |
| 4,387,128 A * | 6/1983 | Emms | B27G 5/00 156/258 |
| 4,671,470 A | 6/1987 | Jonas | |
| 4,715,592 A | 12/1987 | Lewis | |
| 4,887,335 A | 12/1989 | Folkmar | |
| 4,917,747 A | 4/1990 | Chin et al. | |
| 5,125,133 A | 6/1992 | Morrison | |
| 5,331,758 A | 7/1994 | Romick | |
| 5,357,728 A | 10/1994 | Duncanson | |
| 5,509,212 A | 4/1996 | Henricksen | |
| 5,557,904 A | 9/1996 | Dahowski | |
| 5,652,039 A | 7/1997 | Tremain et al. | |
| 5,653,003 A | 8/1997 | Freeman | |
| 5,742,983 A | 4/1998 | Lo | |
| 5,755,068 A | 5/1998 | Ormiston | |
| 5,919,545 A | 7/1999 | Giezendanner et al. | |
| 5,940,935 A | 8/1999 | Julius | |
| 6,164,477 A | 12/2000 | Druckman et al. | |
| 6,251,497 B1 | 6/2001 | Hoopingarner et al. | |
| 6,295,786 B1 | 10/2001 | Lee | |
| 6,325,568 B1 | 12/2001 | Druckman et al. | |
| 6,453,973 B1 | 9/2002 | Russo | |
| 6,685,085 B2 | 2/2004 | Hanna | |
| 6,797,364 B2 | 9/2004 | Okada et al. | |
| 6,948,651 B2 | 9/2005 | Ikeda | |
| 6,968,971 B2 | 11/2005 | Ely | |
| 7,013,535 B2 | 3/2006 | Tracy | |
| 7,188,456 B2 | 3/2007 | Knauseder | |
| 7,302,150 B2 | 11/2007 | Druckman et al. | |
| 7,416,363 B2 | 8/2008 | Kozhuez | |
| 7,534,501 B2 | 5/2009 | Durney | |
| 7,887,249 B2 | 2/2011 | Schmitz | |
| 7,963,038 B2 | 6/2011 | Schmitz | |
| 8,234,901 B2 | 8/2012 | Lewis et al. | |
| 8,312,754 B2 | 11/2012 | Lewis et al. | |
| 9,205,616 B2 | 12/2015 | Young et al. | |
| 2009/0107312 A1 | 4/2009 | Lewis et al. | |
| 2009/0110879 A1 * | 4/2009 | Lewis | B26D 3/065 428/137 |
| 2010/0129584 A1 | 5/2010 | de Groot | |
| 2013/0029107 A1 | 1/2013 | Lewis et al. | |
| 2013/0071612 A1 | 3/2013 | Lewis et al. | |
| 2015/0101738 A1 | 4/2015 | Young et al. | |

FOREIGN PATENT DOCUMENTS

| | | |
|---|---|---|
| GB | 2054086 A | 2/1981 |
| WO | WO9410406 A1 | 5/1994 |
| WO | WO2004104314 A2 | 12/2004 |
| WO | WO2008105789 A2 | 9/2008 |

OTHER PUBLICATIONS

Office Action, dated Apr. 6, 2015, regarding U.S. Appl. No. 14/052,256, 18 pages.
Notice of Allowance, dated Aug. 7, 2015, regarding U.S. Appl. No. 14/052,256, 12 pages.
Japanese Office Action, dated Oct. 10, 2017, regarding Application No. 2014-200909, 6 pages.
State Intellectual Property Office of China First Notification of Office Action, dated Oct. 31, 2017, regarding Application No. 201410521809.9, 9 pages.

* cited by examiner

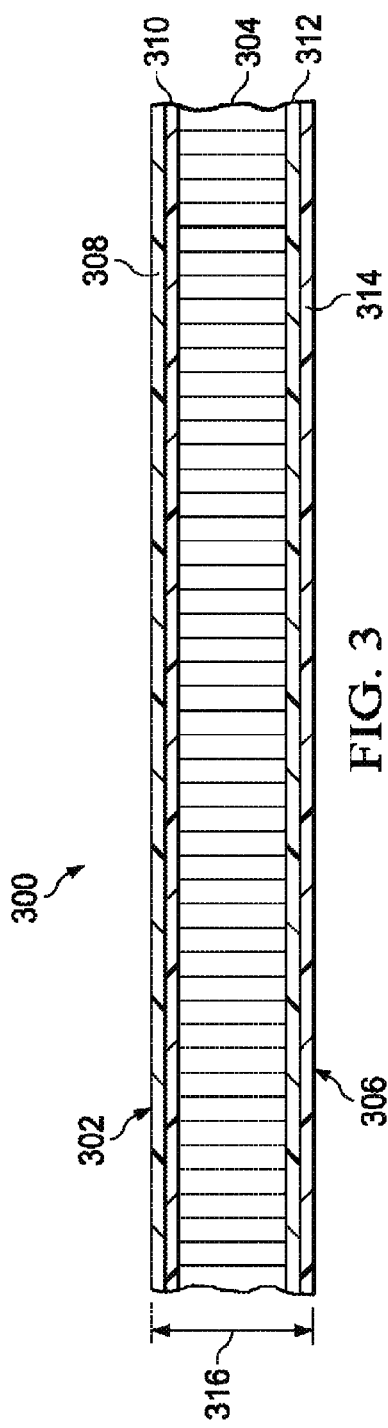
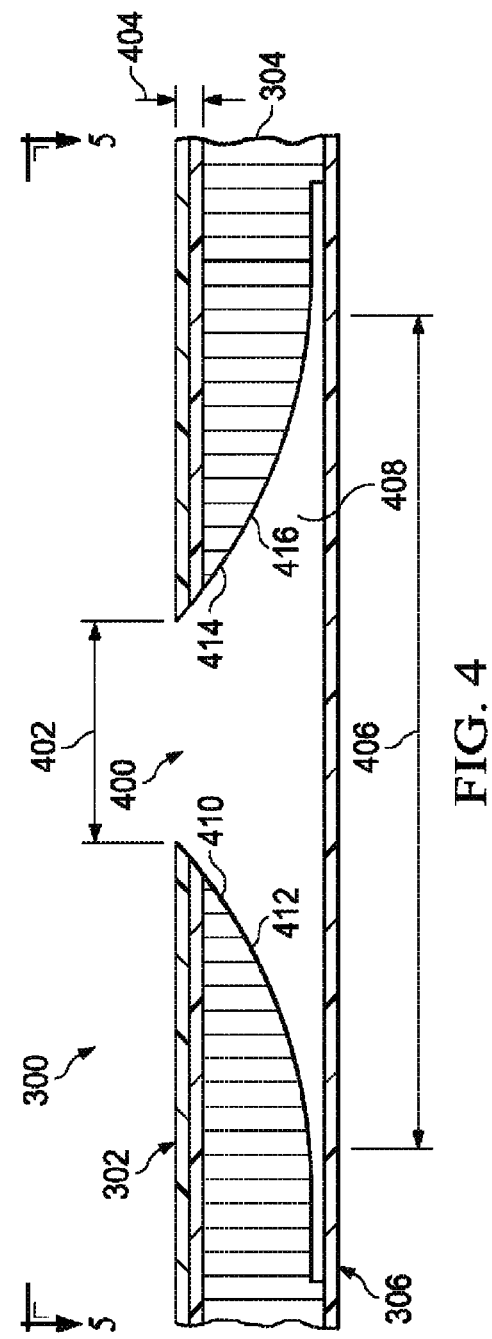

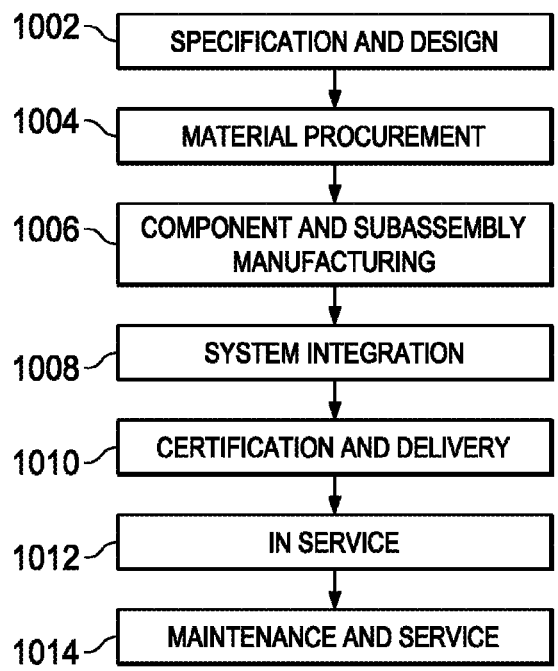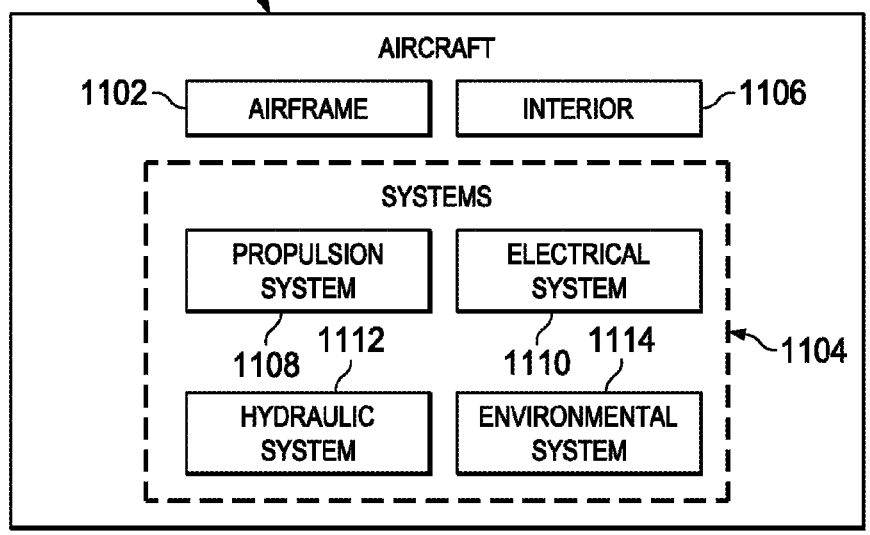

_(1)_

BENDS IN COMPOSITE PANELS

CROSS-REFERENCE TO RELATED APPLICATION(S)

This application is a divisional of and claims the benefit of priority to U.S. patent application Ser. No. 14/052,256, filed Oct. 11, 2013, the entire contents of which are incorporated herein by reference.

BACKGROUND INFORMATION

1. Field

The present disclosure relates generally to aircraft and, in particular, to manufacturing components for an aircraft. Still more particularly, the present disclosure relates to a method and apparatus for creating bends in composite panels for an aircraft.

2. Background

Aircraft are being designed and manufactured with greater and greater percentages of composite materials. Some aircraft may have more than fifty percent of its primary structure made from composite materials. Composite materials may be used in an aircraft to decrease the weight of the aircraft. This decreased weight may improve payload capacities and fuel efficiencies. Further, composite materials may provide longer service life for various components in an aircraft.

Composite materials may be tough, light-weight materials, created by combining two or more dissimilar components. For example, without limitation, a composite may include fibers and resins. The fibers and resins may be combined to form a cured composite material. By using composite materials, portions of an aircraft may be created in larger pieces or sections. For example, a fuselage in an aircraft may be created in cylindrical sections that may be put together to form the fuselage of the aircraft. Other examples may include, without limitation, wing sections joined to form a wing or stabilizer sections joined to form a stabilizer.

Further, interior components of the aircraft also may be made from composite materials. For example, composite panels may be used, without limitation, in floor panels, lavatories, walls, closets, dividers between seating sections, and headers above doorways in an aircraft. In the interior of an aircraft, the composite panels may have an angled shape. This angled shape is also referred to as a bend, and may be created by the intersection of two separate composite panels. In other examples, the angled shape may be created from a single panel.

Currently, a composite panel, in which an angled shape is desired, may be bent to form the angled shape. This angled shape may be, for example, without limitation, an L-shape or about a ninety degree angle. The composite panel may be laid up on a mold or other suitable tool in the bent or angled shape. This composite material may then be cured to form the composite panel with the angled shape. This type of process, however, may require a separate mold or other suitable tool for each particular part.

Having a mold or other suitable tool for each configuration of a composite panel may be costly and complex. Also, if the location or angle of a bend changes for a composite panel, a new mold or other suitable tool may be used to create the composite panel with the change. This change requires additional time and cost.

Accordingly, there is a need for a method and apparatus for reducing the complexity needed to create composite panels with a bend, which overcomes the problems discussed above. Embodiments of the disclosure are intended to satisfy this need.

SUMMARY

In one illustrative embodiment, a method for forming a bend in a composite panel is presented. The method comprises forming a slot having a curved flange in the composite panel, inserting a sheet into the curved flange, and bending the composite panel with the slot and the sheet within the curved flange about a longitudinal axis of the slot to form the bend.

Another illustrative embodiment of the present disclosure presents an apparatus. The apparatus comprises a first layer, a filler layer, and a second layer. A slot having a curved flange is present within the first layer and the filler layer. A sheet is positioned in the curved flange of the slot.

In yet another illustrative embodiment, a method for forming a bend in a composite panel is presented. The method comprises forming a slot having a curved flange in the composite panel, inserting a sheet into the curved flange, and bending the composite panel with the slot and the sheet within the curved flange about a longitudinal axis of the slot to form the bend. The composite panel comprises a filler layer between a first composite layer and a second composite layer, the slot having a bend slot width and the curved flange having a bend allowance width larger than the bend slot width, in which forming the slot comprises cutting the slot with a tool, and in which the tool is a cutter having a shape corresponding to the bend allowance width and the bend slot width. The sheet comprises cured fiberglass and a decorative material adhered to the cured fiberglass, the decorative material comprising at least one of a desired texture or a desired color. The bend slot width is configured such that edges of the first composite layer contact the sheet after bending the composite panel to form the bend.

In a further illustrative embodiment, an apparatus is presented. The apparatus comprises a first layer, a filler layer, a second layer, a sheet, and a bending tool. A slot having a curved flange is present within the first layer and the filler layer, wherein the first layer, the filler layer, and the second layer form a composite panel. The slot has a bend slot width and the curved flange has a bend allowance width larger than the bend slot width. The sheet is positioned in the curved flange of the slot, the sheet comprising cured fiberglass and a decorative material adhered to the cured fiberglass, the decorative material comprising at least one of a desired texture or a desired color. The bending tool is configured to bend the composite panel with the slot having a curved flange to form a bend in the composite panel, in which the bend slot width is configured such that the edges of a first composite layer contact the sheet after bending the composite panel to form the bend.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 3 is an illustration of a cross-sectional view of a composite panel in accordance with an illustrative embodiment;

FIG. 4 is an illustration of a slot in accordance with an illustrative embodiment;

FIG. 10 is an illustration of a block diagram of an aircraft manufacturing and service method in which an illustrative embodiment may be implemented; and FIG. 11 is an illustration of a block diagram of an aircraft in accordance with an illustrative embodiment.

DETAILED DESCRIPTION

The illustrative embodiments recognize and take into account one or more different considerations. For example, the illustrative embodiments recognize and take into account that traditional bends may have limitations on bend angles. For example, it may be undesirable to have a filler layer exposed in a bend. Accordingly, traditional bends may have limitations on bend angles based upon the filler layer and the face sheet thickness. Specifically, the outside bend radius may be limited by the thickness of the filler layer and the face sheet.

The illustrative embodiments recognize and take into account that the thickness of a composite panel may be increased to increase the outside bend radius without exposing the filler layer. However, increasing the thickness of a composite panel may undesirably increase the weight of the composite panel.

Further, the illustrative embodiments recognize and take into account that it may be desirable to cover an exposed filler layer. For example, it may be more aesthetically pleasing to cover an exposed filler layer in a bend. The illustrative embodiments also recognize and take into account that securing a cover over the bend of the composite panel may undesirably add weight to a composite panel of an aircraft. Specifically, the illustrative embodiments recognize and take into account that using fasteners or adhesives to secure a cover over the bend of the composite panel may undesirably increase the weight of the composite panel. The illustrative embodiments further recognize and take into account that using fasteners or adhesives may result in a bond having undesirable durability.

Thus, the illustrative embodiments provide a method and apparatus for forming a bend in a composite panel. The method for forming a bend in a composite panel comprises forming a slot having a curved flange in the composite panel, inserting a sheet into the curved flange, and bending the composite panel with the slot and the sheet, within the curved flange, about a longitudinal axis of the slot to form the bend.

Figure 1:
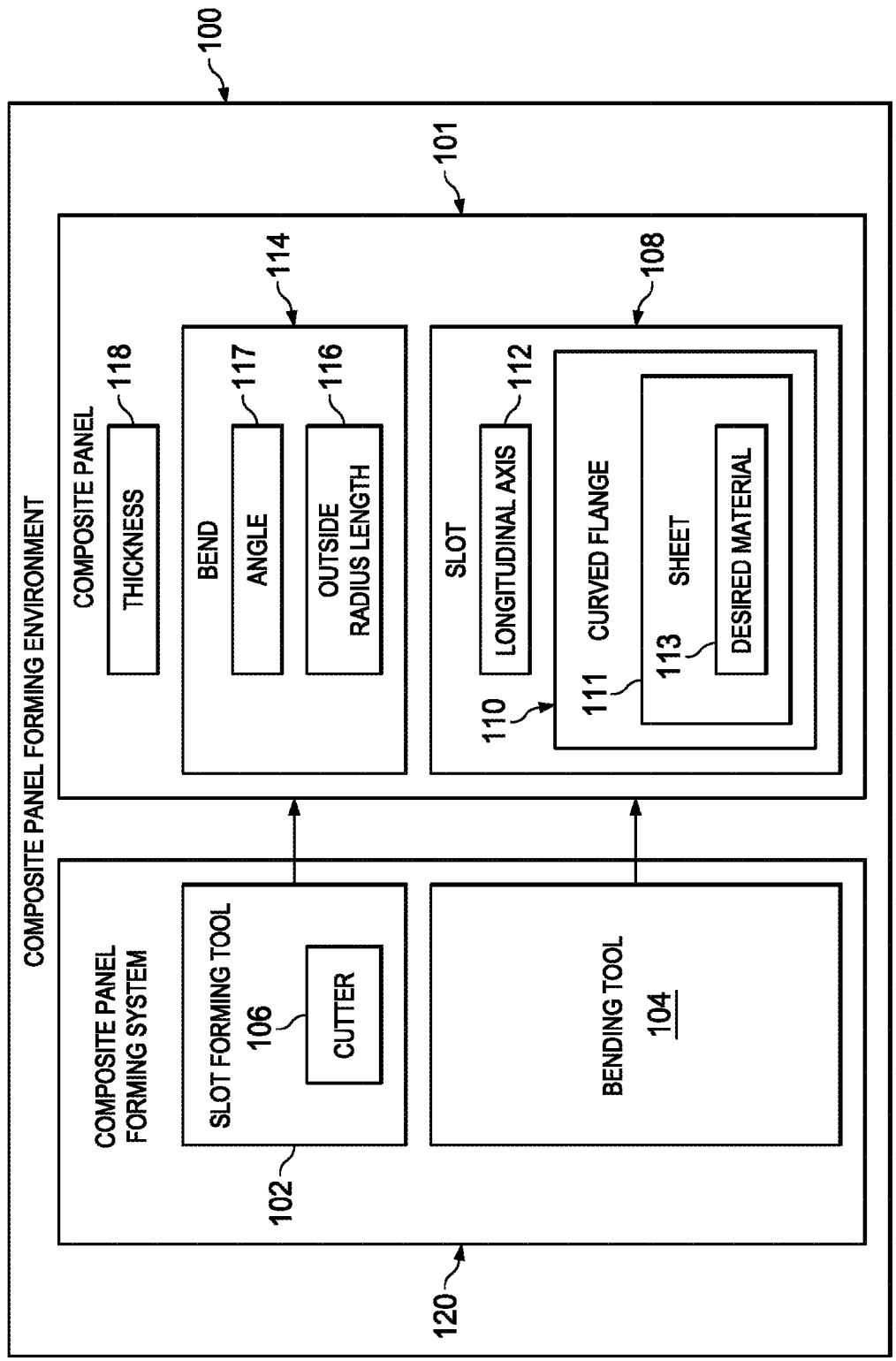
FIG. 1 is an illustration of a block diagram of a composite panel forming environment in accordance with an illustrative embodiment.

With reference now to the figures and, in particular, with reference to FIG. 1, an illustration of a composite panel forming environment is depicted in accordance with an illustrative embodiment. In this illustrative example, composite panel forming environment 100 may be used to form composite panel 101 having bend 114.

As depicted, composite panel forming environment 100 has composite panel 101, and composite panel forming system 120. Composite panel 101 having bend 114 may be formed using composite panel forming system 120. In this illustrative example, composite panel forming system 120 includes slot forming tool 102 and bending tool 104.

In this example, slot forming tool 102 may include cutter 106. Slot forming tool 102, with cutter 106, may be used to cut slot 108 with curved flange 110 in composite panel 101. Sheet 111 may be inserted into curved flange 110. Sheet 111 may be formed of desired material 113. In some illustrative examples, desired material 113 may be flexible enough to be bent into bend 114. Further, desired material 113 may be durable enough to withstand use on an aircraft without significant degradation. In some illustrative examples, sheet 111 may be a fiber reinforced material. In some illustrative examples, sheet 111 may be a composite sheet which is already cured. In one illustrative example, desired material 113 may be cured fiberglass. In some other illustrative examples, desired material 113 may comprise a polymeric material. Composite panel 101 with slot 108 and sheet 111 within curved flange 110 may then be bent about longitudinal axis 112 of slot 108 to form bend 114. Longitudinal axis 112 runs through the length of slot 108. Bend 114 has outside radius length 116 and angle 117. Sheet 111 may enable outside radius length 116 to be larger than an outside radius limited by thickness 118 of composite panel 101.

Bending tool 104 may not be required, in these examples. Composite panel 101 may be bent into the desired shape by hand, without any other tools. In some embodiments, bending tool 104 may be, for example, without limitation, a computer or human controlled machine that bends composite panel 101 into the desired shape for assembly with other components. In another example, bending tool 104 may be a mold on which composite panel 101 may be bent for further processing.

In these examples, slot forming tool 102 may take various forms. For example, without limitation, slot forming tool 102 may be a computer numerical control (CNC) router. A non-limiting example of a computer numerical control that may be implemented as slot forming tool 102 may be a Cincinnati Milacron 1-Access Computer Numerical Control Router, which is available from MAG Cincinnati. Of course, any numerical control (NC) or manual router capable of cutting slot 108 may be used. In other non-limiting examples, slot forming tool 102 may be implemented using a handheld or hand controlled router.

In the different illustrative embodiments, slot 108 with curved flange 110 may be formed with cutter 106. Cutter 106 may have a shape for slot 108 with curved flange 110 such that movements of cutter 106 through composite panel 101 form slot 108 with curved flange 110. In these examples, composite panel 101 may already be cured.

The illustration of composite panel forming environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, without limitation, composite panel forming environment 100 may further include a composite panel manufacturing system. This composite panel manufacturing system may be used to manufacture composite panel 101 prior to bending composite panel 101. Further, although not shown in FIG. 1, composite panel 101 may be formed of a first composite layer, a filler layer, and a second composite layer.

Figure 2:
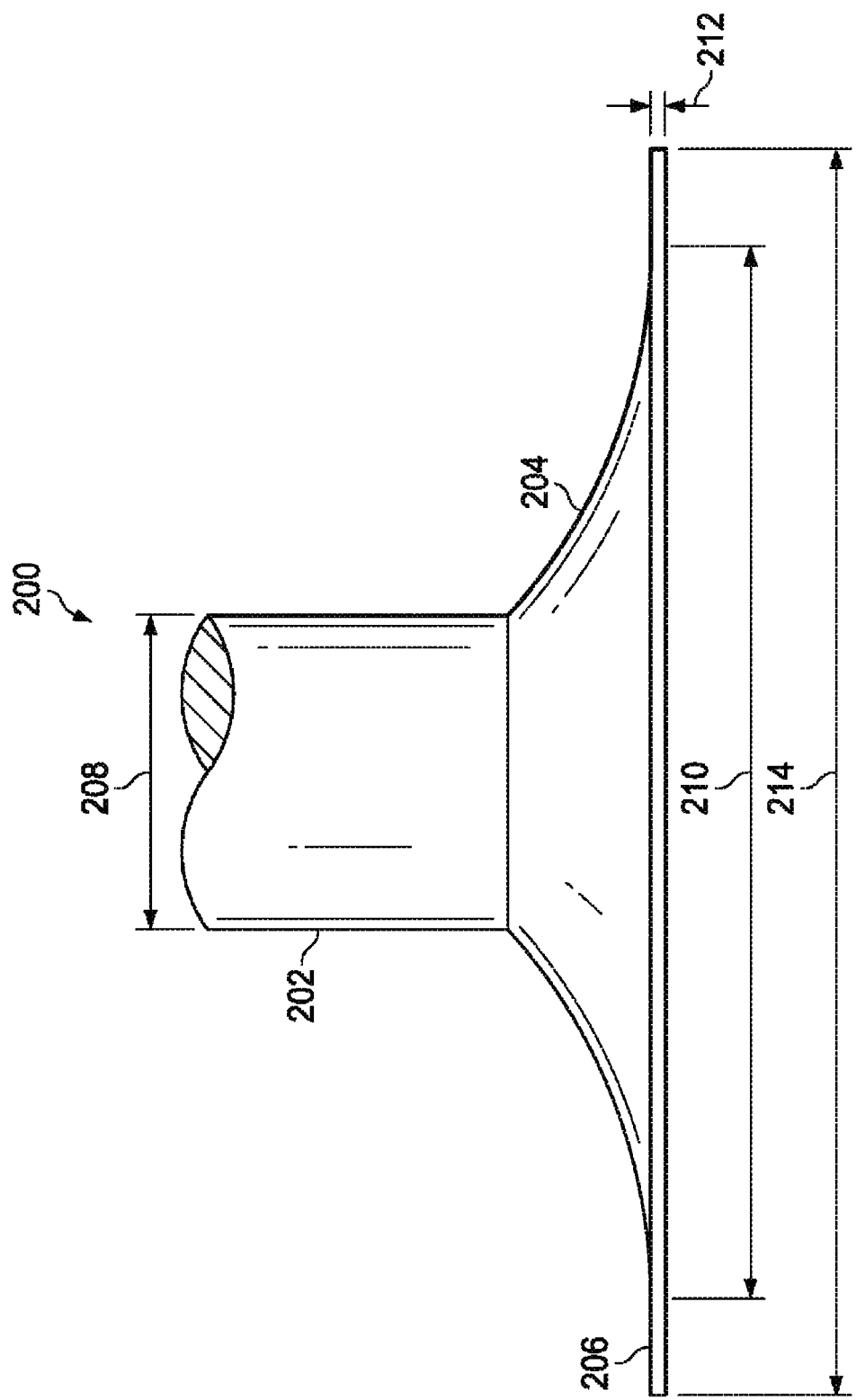
FIG. 2 is an illustration of a cutter in accordance with an illustrative embodiment.

Turning now to FIG. 2, an illustration of cutter 200 is depicted in accordance with an illustrative embodiment. Cutter 200 may be a physical embodiment of cutter 106 used by slot forming tool 102 in FIG. 1. In this example, cutter 200 has shaft 202 and flanged end 204. Cutter 200 may be used to create a slot, such as slot 108 in FIG. 1. Shaft 202 may have thickness 208. Flanged end 204 may have width 210. Width 210 of flanged end 204 may be used to form a slot having a desirable width. Edge 206 of flanged end 204 may have thickness 212 and width 214. In this example, the dimensions of cutter 200 may be used to process a composite panel to form a bend as desired. Cutter 200 may be made from different materials, such as, for example, without limitation, steel, aluminum composite, or any other suitable material. These and other dimensions provided in the various illustrative embodiments are merely examples of one implementation. Other illustrative embodiments may use other dimensions or parameters.

Turning now to FIG. 3, an illustration of a cross-sectional view of composite panel 300 is depicted in accordance with an illustrative embodiment. In this example, composite panel 300 may be a physical implementation of composite panel 101 in FIG. 1. Composite panel 300 may include composite layer 302, also referred to as a first face sheet, filler layer 304, and composite layer 306 or second face sheet.

Composite layer 302 may be formed from two composite plies, plies 308 and 310. In a similar fashion, composite layer 306 also may include two composite plies, ply 312 and ply 314. The number of plies or sub-layers that form composite layer 302 and composite layer 306 may vary, depending on the particular implementation. For example, without limitation, in some implementations, one ply may be used, while in other implementations three plies may be used. The exact number of plies may vary, depending on at least one of the particular uses or implementations.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

Composite layer 302 may be formed of plies having a number of orientations. Examples of orientations include, for example, without limitation, ply directions of 0 degrees, +/−45 degrees, and 90 degrees; and ply directions of 0 degrees, +/−30 degrees, +/−60 degrees, and 90 degrees.

In these examples, the materials that may be used in composite layer 302 and composite layer 306 may take the form of a resin pre-impregnated fabric. This type of fabric also may be referred to as a pre-preg fabric. These types of reinforcements may take the form of woven fabrics, roving, and unidirectional tape. With this type of fabric, the resin and curing agent may be impregnated into a reinforcing fiber or material prior to layup. In these particular examples, composite layer 302 and composite layer 306 may be, for example, without limitation, resin pre-impregnated fabrics with polyester and fiberglass, phenolic and fiberglass, epoxy and carbon fiber, epoxy, fiberglass, metallic, foil, screen, or any other suitable material.

Filler layer 304 may be formed using a number of different materials. For example, without limitation, Nomex® fibers, fiberglass, arimid, metallic, or other suitable materials may be used for filler layer 304. In these examples, filler layer 304 also may have a shape of a honeycomb matrix to form a honeycombed panel. Filler layer 304 may provide a structure to create the thickness desired for composite panel 300 without using heavy materials, such as those that may be found in composite layer 302 and composite layer 306. In some illustrative examples, filler layer 304 may also be called a core. In some illustrative examples in which filler layer 304 has a shape of a honeycomb matrix, filler layer 304 may be referred to as a honeycomb core.

Filler layer 304 may provide composite panel 300 with a strength equivalent to or greater than a solid laminate. Filler layer 304 may provide composite panel 300 with a weight lower than a solid laminate. In some illustrative examples, separating composite layer 302 and composite layer 306 with filler layer 304 provides a desirable strength and a desirable weight. At least one of material of filler layer 304 and shape of filler layer 304 may affect the strength and weight of composite panel 300.

In this example, composite panel 300 has thickness 316. Thickness 316 may be about one inch thick. Thickness 316 of composite panel 300 may vary, depending on the particular implementation. Examples of ranges include, for example, without limitation, between about 0.375 inches to about 1.5 inches, or any other suitable range.

Composite panel 300 may be, in other examples, a range from about 0.25 inches to about 2.5 inches thick. In these examples, the radius bend may be up to about 3.4 times the thickness of composite panel 300. With these ranges, composite panel 300 may have a bend radius of up to about 1.7 inches when composite panel 300 is about 0.5 inches thick. When composite panel 300 is about 1 inch thick, this panel may have a bend radius of up to about 3.47 inches when composite panel 300 is about 0.5 inches thick. These examples are merely for purposes of illustration and the dimensions may vary as implementations vary.

With reference now to FIG. 4, an illustration of slot 400 is depicted in accordance with an illustrative embodiment. In these examples, slot 400 may be formed after curing composite panel 300. A tool, such as cutter 200 in FIG. 2, may be used to form a slot within composite panel 300 in FIG. 3.

In this example, slot 400 may be formed within composite panel 300. Slot 400 may be formed in a single pass of a tool, such as cutter 200 in FIG. 2, through composite panel 300 in FIG. 3. Slot 400 may have bend slot width 402 along section 404. Thereafter, slot 400 widens in width to bend allowance width 406. The widening of the width of slot 400 increases to form curved flange 408. In this particular example, bend allowance width 406 may have a width corresponding to the width of flanged end 204 in cutter 200 in FIG. 2.

The dimensions of cutter 200 may be selected to form slot 400 having desired dimensions. The dimensions of slot 400 may influence dimensions of a bend formed in composite panel 300. Accordingly, the dimensions of cutter 200 may be selected such that a bend in composite panel 300 having at least one of a desired angle and a desired outside radius length. Curve 410 of surface 412 may be selected to form a bend in composite panel 300 having at least one of a desired angle and a desired outside radius length in conjunction with bend slot width 402. Curve 414 of surface 416 may be selected to form a bend in composite panel 300 having at least one of a desired angle and a desired outside radius length in conjunction with bend slot width 402.

Figure 5:
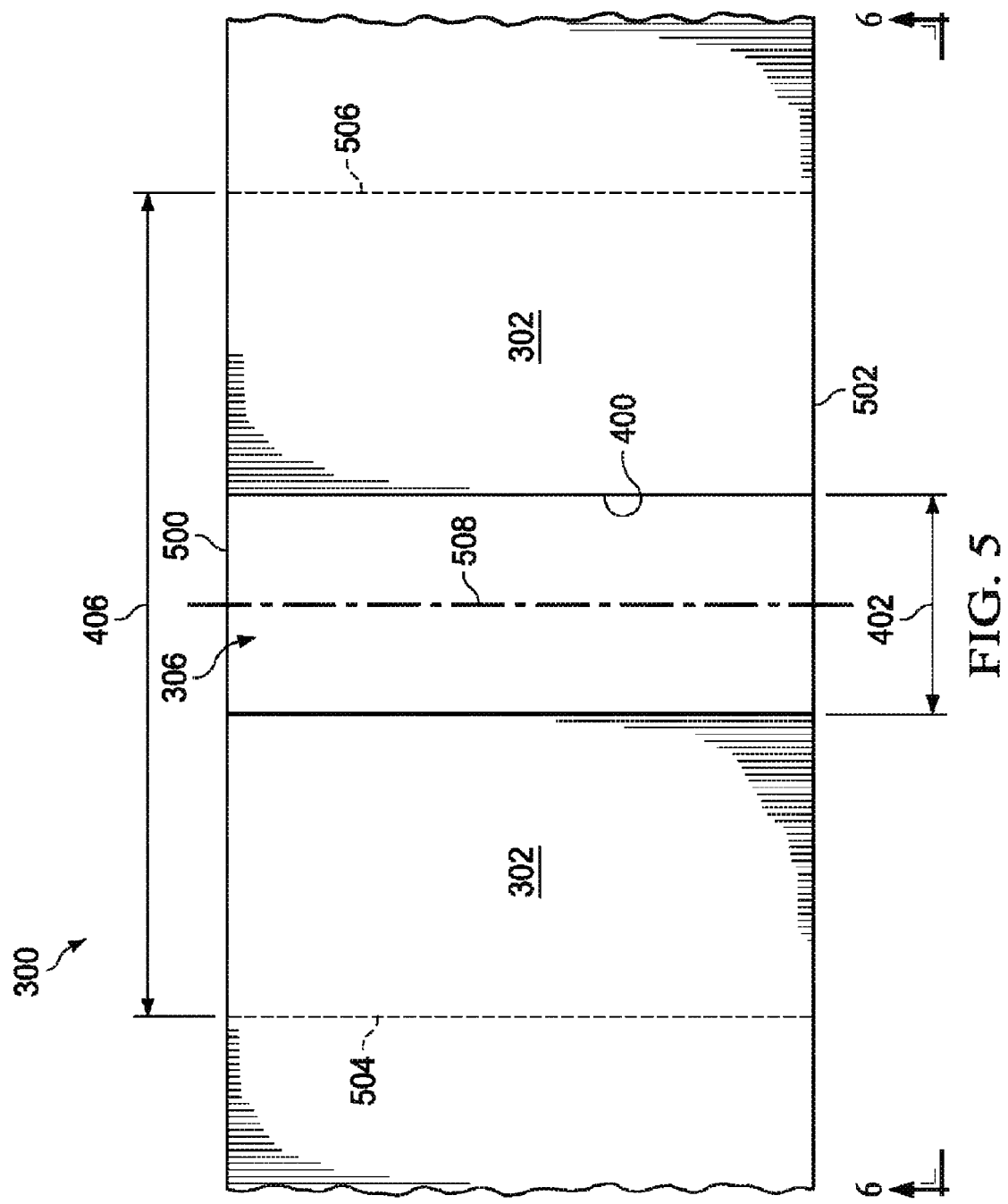
FIG. 5 is an illustration of a top view of a composite panel in accordance with an illustrative embodiment.

Turning now to FIG. 5, an illustration of a top view of a composite panel is depicted in accordance with an illustrative embodiment. Specifically, a top view of composite panel 300 is shown in the direction of line 5-5 in FIG. 4. As can be seen in this particular example, slot 400 may extend from side 500 to side 502 of composite panel 300. In creating slot 400, a cutter tool, such as cutter 200 in FIG. 2, may be moved along composite panel 300 from side 500 to side 502 to create slot 400. Dotted line 504 and dotted line 506 may illustrate the locations of edges of bend allowance width 406, which is not visible in this view. Slot 400 has longitudinal axis 508. As depicted, longitudinal axis 508 may run the length of slot 400 from side 500 to side 502. In some illustrative embodiments, composite panel 300 may be bent about the longitudinal axis 508.

Figure 6:
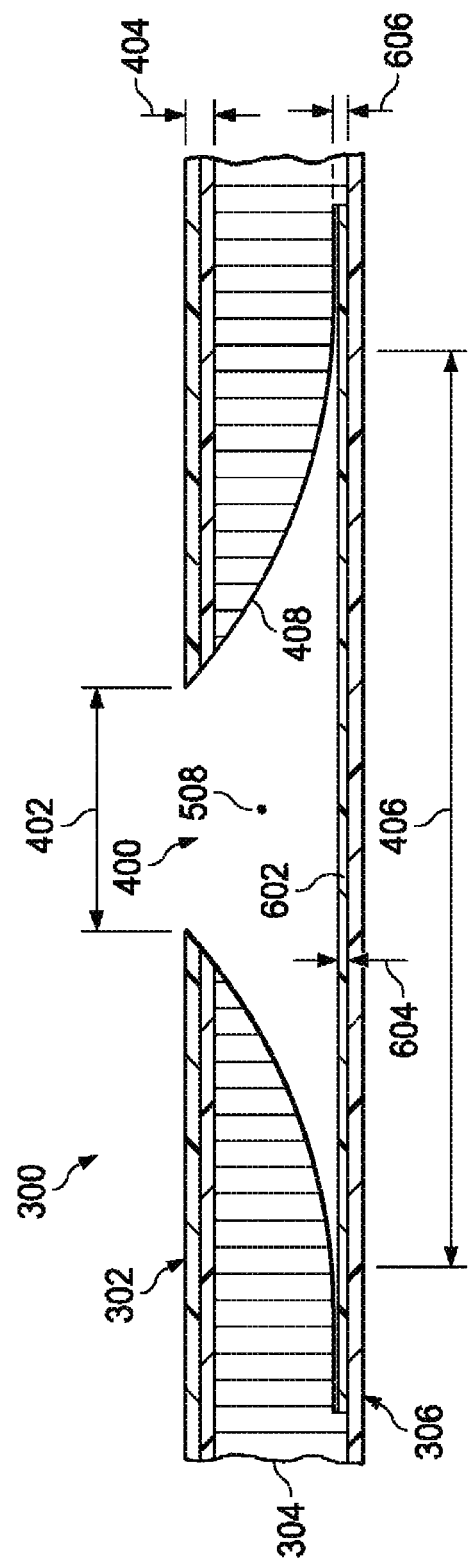
FIG. 6 is an illustration of a slot with a sheet in accordance with an illustrative embodiment.

With reference now to FIG. 6, an illustration of a slot with a sheet is depicted in accordance with an illustrative embodiment. Specifically, a view of composite panel 300 with a sheet within curved flange 408 of slot 400. Sheet 602 may be a physical embodiment of sheet 111 of FIG. 1. FIG. 6 is a view in the direction of line 6-6, in FIG. 5, which is also the view from FIG. 3 and FIG. 4.

Sheet 602 has thickness 604. As depicted, thickness 604 is less than thickness 606 of slot 400 at the edge of bend allowance width 406. Thickness 606 of slot 400 at the edge of bend allowance width 406 may be formed by thickness of edge 206 of flanged end 204 of FIG. 2.

Figure 7:
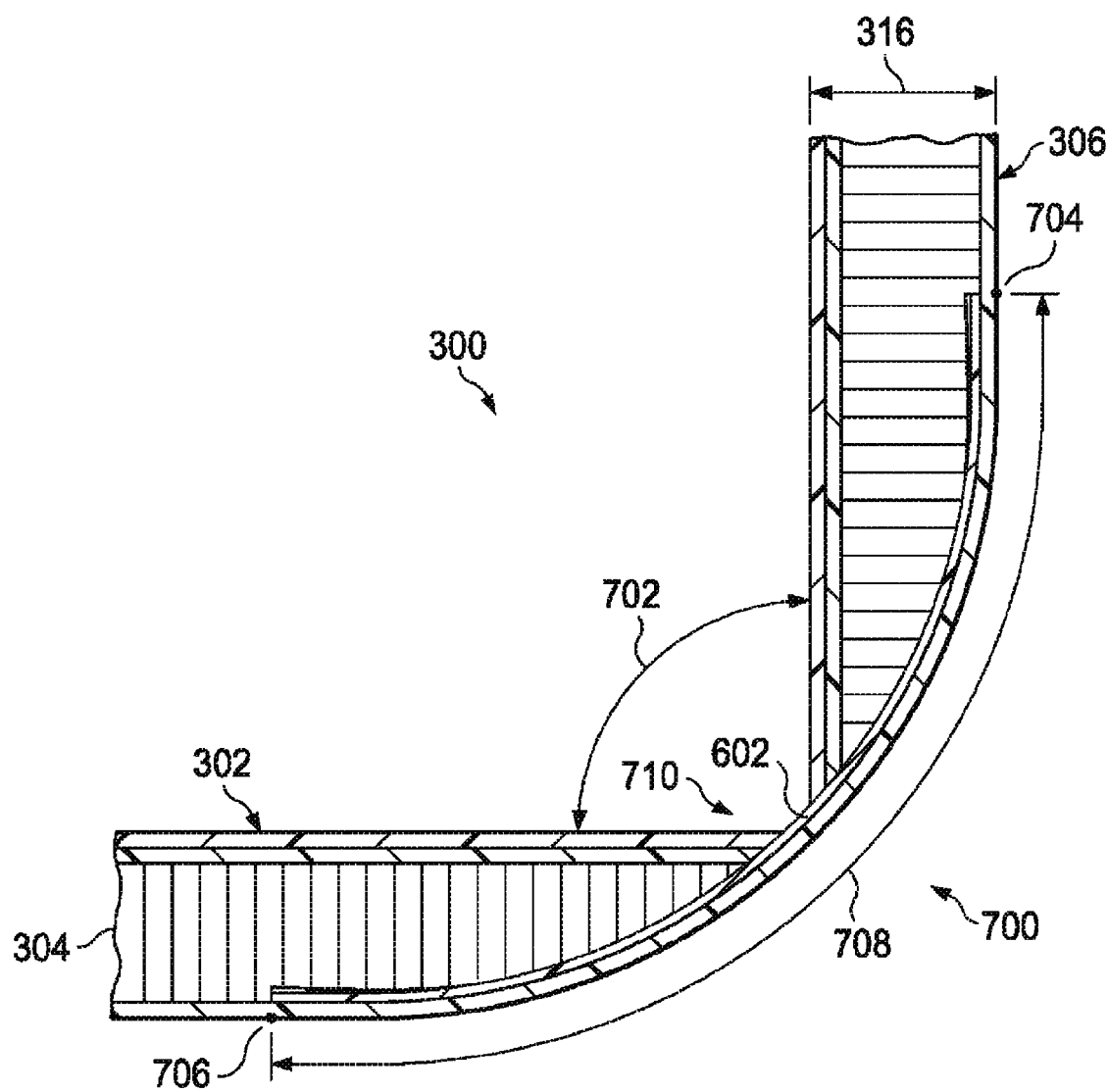
FIG. 7 is an illustration of a composite panel in a bent configuration in accordance with an illustrative embodiment.

FIG. 7 is an illustration of a composite panel in a bent configuration in accordance with an illustrative embodiment. In these examples, composite panel 300 and sheet 602 may be bent around longitudinal axis 508 of slot 400. A tool, such as bending tool 104 in FIG. 1, may be used to bend composite panel 300 and sheet 602.

In this example, composite panel 300 has bend 700. Composite panel 300 may have angle 702. This angle may be about ninety degrees, in this example. Angle 702, of course, may vary, depending of the particular embodiment. For example, angle 702 may be seventy-five degrees, eighty degrees, one-hundred twenty degrees, or any other suitable angle. As depicted, bend 700 extends from point 704 to point 706. Outside radius length 708 of bend 700 is the distance from point 704 to point 706.

As depicted, the dimensions of slot 400 affect at least one of angle 702 and outside radius length 708. The dimensions of cutter 200 in FIG. 2 affect the dimensions of slot 400. Accordingly, the dimensions of cutter 200 may be selected to form bend 700 having outside radius length 708. The dimensions of cutter 200 may be selected to form angle 702. By changing dimensions of cutter 200, at least one of outside radius length 708 and angle 702 of bend 700 may be changed. As depicted, sheet 602 and composite layer 302 form inner surface 710 of bend 700.

Bend slot width 402 of slot 400 from FIGS. 4-6 may be selected to form bend 700. Bend slot width 402 may be configured such that edges of composite layer 302 contact sheet 602 after bending composite panel 300 to form bend 700. Bend slot width 402 may be configured such that edges of composite layer 302 are prevented from contacting each other after bending composite panel 300 to form bend 700. In these examples, bend slot width 402 may be characterized as follows:

$$BA > 2\pi R * \frac{A}{360}$$

BA may be bend allowance width 406 and R may be the corner radius. In this example, A may be a bend angle, such as angle 702.

In these examples, bend slot width 402 may be characterized as follows:

$$BS > BA - 2K(R-T)$$

BS may be bend slot width 402, BA may be bend allowance width 406, K may be TAN(A/2), and T may be the thickness of composite panel 300.

By inserting sheet 602 into curved flange 408 of slot 400, thickness 316 of composite panel 300 may not limit outside radius length 708. By bending composite panel 300 with slot 400 and sheet 602 within curved flange 408 about longitudinal axis 508 of the slot, sheet 602 may be contained within slot 400 without adhesives or fasteners. Sheet 602 may cover exposed filler layer 304.

Sheet 602 may comprise a desired material and a decorative layer. In some illustrative examples, the desired material comprises cured fiberglass. In these illustrative examples, a decorative layer may be adhered to the cured fiberglass. The decorative layer may provide at least one of a desired color or desired texture.

In other illustrative examples, sheet 602 may include information such as text, a sign, or other graphical indicators. In some illustrative examples, the decorative layer may include information such as text, a sign, or other graphical indicators. Sheet 602 may contain or form a portion of a flexible organic light emitting diode (OLED) display. In this manner, sheet 602 also may provide light, information, or perform other suitable functions. In these illustrative examples, the decorative layer may form inner surface 710 of bend 700.

The different components shown in FIGS. 2-7 may be combined with components in FIG. 1, used with components in FIG. 1, or a combination of the two. Additionally, some of the components in FIGS. 2-7 may be illustrative examples of how components shown in block form in FIG. 1 can be implemented as physical structures.

Figure 8:
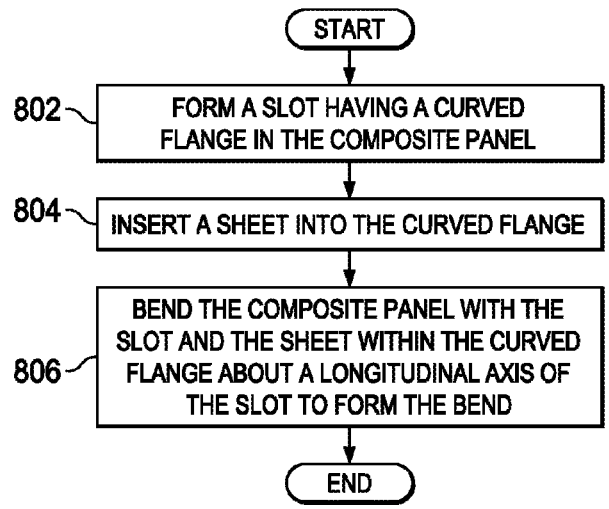
FIG. 8 is an illustration of a flowchart of a process for forming a bend in a composite panel in accordance with an illustrative embodiment.

Turning now to FIG. 8, an illustration of a flowchart of a process for forming a bend in a composite panel is depicted in accordance with an illustrative embodiment. The process illustrated in FIG. 8 may be implemented in composite panel forming environment 100. The process may be implemented using composite panel forming system 120 in composite panel forming environment 100 to form composite panel 101. In particular, this process may form bend 114 in composite panel 101 in FIG. 1.

The process may begin by forming a slot having a curved flange in the composite panel (operation 802). The slot may be slot 108 of FIG. 1. The slot may be slot 400 in FIG. 4. In some illustrative examples, the forming step comprises cutting slot 400 with a tool, wherein the tool is cutter 200 having a shape corresponding to bend allowance width 406 and bend slot width 402. Slot 400 may be formed in composite layer 302 and filler layer 304. Slot 400 may be formed by cutting away a portion of composite layer 302, and portions of filler layer 304 of composite panel 300. In one illustrative example, slot 400 with curved flange 408 may be cut into composite panel 300. The process may then insert a sheet into the curved flange (operation 804). The sheet may be sheet 111 of FIG. 1. In some illustrative examples, the sheet may be formed of cured fiberglass. Next the process may bend composite panel 300 with slot 400 and sheet 111 within curved flange 408 about longitudinal axis 508 of slot 400 to form the bend (operation 806). By bending composite panel 300 with slot 400 and sheet 111 within curved flange 408 about longitudinal axis 508 of slot 400, sheet 111 may be contained within slot 108 without adhesives or fasteners.

Figure 9:
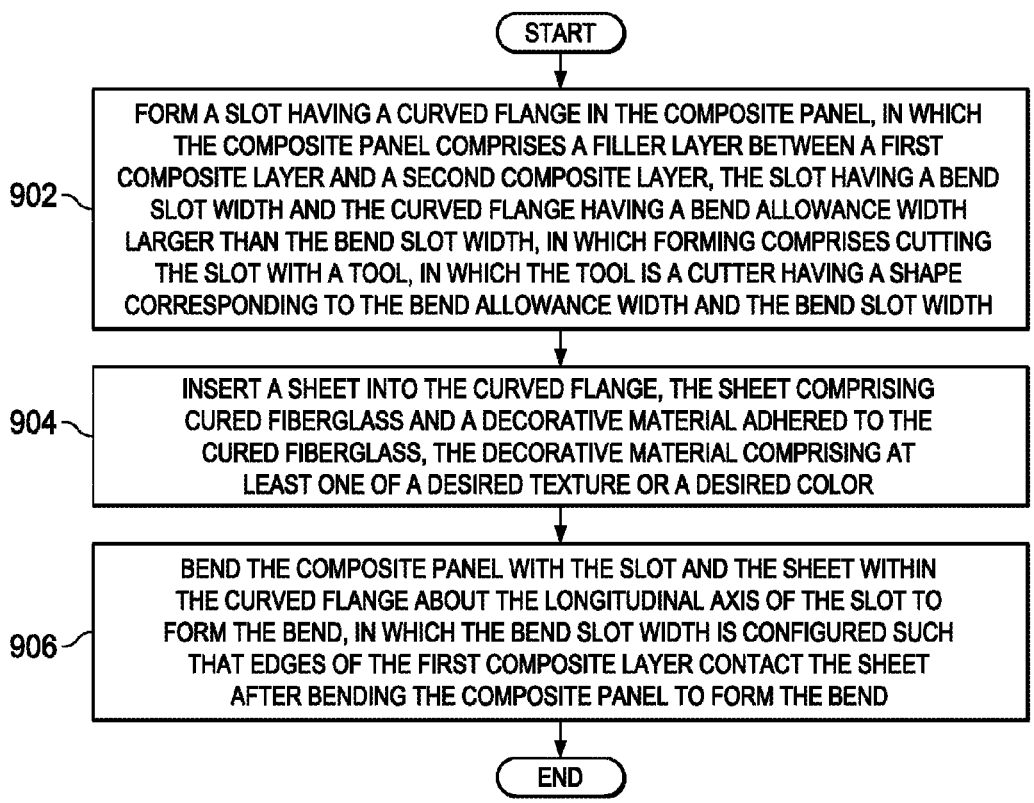
FIG. 9 is an illustration of a flowchart of a process for forming a bend in a composite panel in accordance with an illustrative embodiment.

With reference now to FIG. 9, an illustration of a flowchart of a process for forming a bend in a composite panel is depicted in accordance with an illustrative embodiment. The process illustrated in FIG. 9 may be implemented to form bend 114 in composite panel 101 in FIG. 1.

The process may begin by forming a slot 400 having a curved flange 408 in the composite panel 300, in which the composite panel 300 comprises a filler layer 304 between a first composite layer and a second composite layer, the slot 400 having a bend slot width 402 and the curved flange 408 having a bend allowance width 406 larger than the bend slot width 402, in which forming comprises cutting the slot 400 with a tool, in which the tool is a cutter 200 having a shape corresponding to the bend allowance width 406 and the bend slot width 402 (operation 902). Tool may be slot forming tool 102. First composite layer may be composite layer 302. Second composite layer may be composite layer 306. The slot may be slot 108 in FIG. 1. The slot may be formed by removing a portion of the first composite layer and a portion of the filler layer. In some illustrative examples, the composite panel may be composite panel 300 having composite layer 302, filler layer 304, and composite layer 306.

The process may then insert a sheet into the curved flange, the sheet comprising cured fiberglass and a decorative material adhered to the cured fiberglass, the decorative material comprising at least one of a desired texture or a desired color (operation 904). The sheet may be sheet 602 of FIG. 6.

The process may then bend the composite panel with the slot and the sheet within the curved flange about the longitudinal axis of the slot to form the bend 700, in which the bend slot width is configured such that edges of the first composite layer contact the sheet after bending the composite panel to form the bend (operation 906). By bending the composite panel with the slot and the sheet within the curved flange about the longitudinal axis of the slot, the sheet may be contained within the slot without adhesives or fasteners. Specifically, contact between the sheet and at least one of the filler layer, the first composite layer, and the second composite layer holds the sheet within the slot. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. One or more illustrative embodiments may be used during component and subassembly manufacturing 1006. For example, composite panel 101 with bend 114 in FIG. 1 may be used during at least one of component and subassembly manufacturing 1006 or system integration 1008. Specifically, composite panel 101 with bend 114 in FIG. 1 may be formed during at least one of component and subassembly manufacturing 1006 or system integration 1008. Composite panel 101 with bend 114 may be a part for aircraft 1100. Specifically, composite panel 101 with bend 114 in FIG. 1 may be a part of interior 1106 of aircraft 1100. Further, composite panel 101 with bend 114 in FIG. 1 may be joined with other parts during component and subassembly manufacturing 1006. Yet further, composite panel 101 with bend 114 in FIG. 1 may also be used to perform replacements and upgrades during maintenance and service 1014. In particular during maintenance and service 1014, bends may be formed in composite panels used during routine maintenance, upgrades, refurbishment, and other operations that may be performed during maintenance and service 1014. For example, aircraft 1100 may be inspected during scheduled maintenance for aircraft 1100.

Also, one or more apparatus embodiments, method embodiments, or a combination thereof may be utilized during system integration 1008 and certification and delivery 1010, for example, by substantially expediting assembly of or reducing the cost of aircraft 1100. Similarly, one or more of apparatus embodiments, method embodiments, or a combination thereof may be utilized while aircraft 1100 is in service, for example and without limitation, to maintenance and service 1016.

The illustrative embodiments provide a method and apparatus for forming a bend in a composite panel. Specifically, the illustrative embodiments provide a method and apparatus for forming a bend in a composite panel in which an outside radius length of the bend is not limited by a thickness of the composite panel.

By inserting sheet 602 into curved flange 408 of slot 400, sheet 602 may form part of inner surface 710 of bend 700. Sheet 602 may cover exposed portions of filler layer 304. Further, sheet 602 may provide at least one of a desired color and a desired texture.

Bend slot width 402 may be configured such that edges of composite layer 302 contact sheet 602 after bending composite panel 300 to form bend 700. Accordingly, sheet 602 may be held within slot 400 without adhesive or fasteners. Use of sheet 602 may allow for composite panel 300 to have a lower weight than the thickness of composite panel 300 was increased so that edges of composite layer 302 touch each other. Use of sheet 602 may allow for composite panel 300 to have a lower weight than if a cover were fastened or adhered over an exposed filler layer.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a filler layer;
   a first layer adhered to a first side of the filler layer; wherein
   a slot is present within the first layer and the filler layer, the slot having:
      a curved flange;
      a first width at a first surface, wherein the first width is large enough that edges of the slot are prevented from contacting each other after bending; and
      a second width proximal to a second surface, wherein the second width is greater than the first width; and
   a second layer adhered to a second side of the filler layer; and
   a sheet positioned in the curved flange of the slot.

2. The apparatus of claim 1, wherein the first layer is a first composite layer and the second layer is a second composite layer.

3. The apparatus of claim 1, wherein the first layer, the filler layer, and the second layer form a composite panel.

4. The apparatus of claim 3 further comprising:
   a bending tool configured to bend the composite panel with the slot having the curved flange to form a bend in the composite panel.

5. The apparatus of claim 4, wherein the first width is a bend slot width and the second width is a bend allowance width.

6. The apparatus of claim 5, wherein the bend slot width is:

$$BS > BA - 2K(R-T)$$

wherein BS is the bend slot width, BA is the bend allowance width, R is a corner radius, K is Tan(A/2), A is a bend angle, and T is a thickness of the composite panel.

7. The apparatus of claim 5, wherein the bend slot width is configured such that the edges of the slot contact the sheet after bending the composite panel to form the bend.

8. The apparatus of claim 5, wherein the first layer is a first composite layer, and wherein the bend slot width is configured such that edges of the first composite layer are prevented from contacting each other after bending the composite panel to form the bend.

9. An apparatus comprising:
   a filler layer;
   a first layer adhered to a first side of the filler layer;
   a second layer adhered to a second side of the filler layer, in which a slot having a curved flange is present within the first layer and the filler layer, in which the first layer, the filler layer, and the second layer form a composite panel, the slot having a bend slot width and the curved flange having a bend allowance width larger than the bend slot width;
   a sheet positioned in the curved flange of the slot, the sheet comprising cured fiberglass and a decorative material adhered to the cured fiberglass, the decorative material comprising at least one of a desired texture or a desired color; and
   a bending tool configured to bend the composite panel with the slot having the curved flange to form a bend in the composite panel, in which the bend slot width is configured such that edges of a first composite layer contact the sheet after bending the composite panel to form the bend.

* * * * *